United States Patent
Jeschke et al.

(10) Patent No.: US 10,002,298 B2
(45) Date of Patent: Jun. 19, 2018

(54) METHOD AND CONTROL AND RECORDING DEVICE FOR THE PLAUSIBILITY CHECKING FOR THE WRONG-WAY TRAVEL OF A MOTOR VEHICLE

(71) Applicant: Robert Bosch GmbH, Stuttgart (DE)

(72) Inventors: Christian Jeschke, Beilstein (DE); Christian Braeuchle, Hassmersheim-Hochhausen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 12 days.

(21) Appl. No.: 14/478,965

(22) Filed: Sep. 5, 2014

(65) Prior Publication Data

US 2015/0071496 A1    Mar. 12, 2015

(30) Foreign Application Priority Data

| Sep. 6, 2013 | (DE) | 10 2013 217 833 |
| Nov. 15, 2013 | (DE) | 10 2013 223 397 |
| Nov. 15, 2013 | (DE) | 10 2013 223 398 |
| Nov. 15, 2013 | (DE) | 10 2013 223 400 |
| Nov. 15, 2013 | (DE) | 10 2013 223 403 |
| Nov. 15, 2013 | (DE) | 10 2013 223 408 |
| Nov. 15, 2013 | (DE) | 10 2013 223 410 |
| Jun. 3, 2014 | (DE) | 10 2014 210 411 |

(51) Int. Cl.
   *G06K 9/00* (2006.01)

(52) U.S. Cl.
   CPC ..... *G06K 9/00798* (2013.01); *G06K 9/00818* (2013.01)

(58) Field of Classification Search
   CPC .................. G06K 9/00798–9/00825
   See application file for complete search history.

(56) References Cited

U.S. PATENT DOCUMENTS 5,987,174 A * 11/1999 Nakamura ......... G06K 9/00798
                                                     382/104
6,091,833 A * 7/2000 Yasui .................. G05D 1/0246
                                                     348/118

(Continued)

FOREIGN PATENT DOCUMENTS

| CN | 101765757 A | 6/2010 |
| CN | 102184547 A | 9/2011 |

(Continued)

*Primary Examiner* — Aaron W Carter
(74) *Attorney, Agent, or Firm* — Norton Rose Fulbright US LLP; Gerard Messina

(57) ABSTRACT

A method is described for the plausibility checking for wrong-way travel of a motor vehicle on a directional roadway of the road, at least one visual road feature being recorded and, with the aid of the visual road feature, it is determined whether the motor vehicle is located on a directional roadway. Furthermore, a control and recording device for the plausibility checking for wrong-way travel of a motor vehicle on a directional roadway of a road is provided, having a recording arrangement for recording at least one visual road feature and a determining arrangement for determining, with the aid of the visual road feature, whether the motor vehicle is located on a directional roadway.

21 Claims, 3 Drawing Sheets

(56) References Cited

U.S. PATENT DOCUMENTS

| | | | |
|---|---|---|---|
| 6,819,779 B1* | 11/2004 | Nichani | G06K 9/00798 |
| | | | 382/104 |
| 9,638,615 B2* | 5/2017 | Mielenz | G01N 5/02 |
| 9,676,330 B2* | 6/2017 | Takemae | B60R 1/00 |
| 9,786,166 B2* | 10/2017 | Jeschke | G08G 1/056 |
| 2003/0026456 A1* | 2/2003 | Akutagawa | G06K 9/00798 |
| | | | 382/104 |
| 2004/0042638 A1* | 3/2004 | Iwano | G06K 9/00798 |
| | | | 382/104 |
| 2004/0066376 A1* | 4/2004 | Donath | B60R 1/00 |
| | | | 345/169 |
| 2005/0149251 A1* | 7/2005 | Donath | G01C 21/26 |
| | | | 701/532 |
| 2007/0084655 A1* | 4/2007 | Kakinami | G06K 9/00798 |
| | | | 180/167 |
| 2007/0107965 A1* | 5/2007 | Kakinami | G06K 9/00798 |
| | | | 180/167 |
| 2008/0140318 A1* | 6/2008 | Breed | B60N 2/2863 |
| | | | 702/3 |
| 2008/0165018 A1* | 7/2008 | Breed | G08G 1/161 |
| | | | 340/573.1 |
| 2008/0317288 A1* | 12/2008 | Aoki | G06K 9/00798 |
| | | | 382/104 |
| 2009/0080704 A1* | 3/2009 | Mori | G08G 1/167 |
| | | | 382/104 |
| 2010/0002911 A1* | 1/2010 | Wu | B60W 30/12 |
| | | | 382/104 |
| 2010/0280751 A1* | 11/2010 | Breed | G08G 1/161 |
| | | | 701/414 |
| 2012/0136538 A1* | 5/2012 | Schepp | B60W 30/09 |
| | | | 701/41 |
| 2012/0323474 A1* | 12/2012 | Breed | B60W 30/04 |
| | | | 701/117 |
| 2013/0101174 A1* | 4/2013 | Meis | G08G 1/096716 |
| | | | 382/104 |
| 2013/0162448 A1* | 6/2013 | Mochizuki | G08G 1/096775 |
| | | | 340/905 |
| 2013/0238192 A1* | 9/2013 | Breu | G01S 13/726 |
| | | | 701/41 |
| 2014/0139670 A1* | 5/2014 | Kesavan | G06K 9/00791 |
| | | | 348/148 |
| 2014/0313369 A1* | 10/2014 | Kageyama | G06T 11/001 |
| | | | 348/223.1 |
| 2014/0354454 A1* | 12/2014 | Nordbruch | G08G 1/056 |
| | | | 340/935 |
| 2015/0071496 A1* | 3/2015 | Jeschke | G06K 9/00798 |
| | | | 382/104 |
| 2015/0092056 A1* | 4/2015 | Rau | G08G 1/167 |
| | | | 348/148 |
| 2015/0145699 A1* | 5/2015 | Mielenz | G08G 1/056 |
| | | | 340/935 |
| 2015/0148987 A1* | 5/2015 | Jeschke | G01S 1/08 |
| | | | 701/1 |
| 2015/0153735 A1* | 6/2015 | Clarke | B60W 30/00 |
| | | | 701/301 |
| 2015/0197248 A1* | 7/2015 | Breed | G08G 1/09626 |
| | | | 701/93 |
| 2016/0203716 A1* | 7/2016 | Jeschke | B60W 40/072 |
| | | | 701/532 |
| 2016/0210855 A1* | 7/2016 | Jeschke | G08G 1/04 |
| 2016/0217688 A1* | 7/2016 | Jeschke | G06K 9/00798 |
| 2016/0225256 A1* | 8/2016 | Hofsaess | G08G 1/056 |

FOREIGN PATENT DOCUMENTS

| | | |
|---|---|---|
| CN | 102663896 A | 9/2012 |
| CN | 102792350 A | 11/2012 |
| JP | 4557299 B2 | 10/2010 |

* cited by examiner

METHOD AND CONTROL AND RECORDING DEVICE FOR THE PLAUSIBILITY CHECKING FOR THE WRONG-WAY TRAVEL OF A MOTOR VEHICLE

RELATED APPLICATION INFORMATION

The present application claims priority to and the benefit of German Patent Application No. 10 2013 217 833.6, filed in Germany on Sep. 6, 2013, German Patent Application No. 10 2013 223 410.4, filed in Germany on Nov. 15, 2013, German Patent Application No. 10 2013 223 397.3, filed in Germany on Nov. 15, 2013, German Patent Application No. 10 2013 223 408.2, filed in Germany on Nov. 15, 2013, German Patent Application No. 10 2013 223 400.7, filed in Germany on Nov. 15, 2013, German Patent Application No. 10 2013 223 403.1, filed in Germany on Nov. 15, 2013, German Patent Application No. 10 2013 223 398.1, filed in Germany on Nov. 15, 2013, and German Patent Application No. 10 2014 210 411.4, filed in Germany on Jun. 3, 2014, the disclosures of which are incorporated herein by reference.

FIELD OF THE INVENTION

The present invention relates to a method and a control and recording device for the plausibility checking of the wrong-way travel of a motor vehicle on a directional roadway.

BACKGROUND INFORMATION

In case of an accident, blind siders, also designated as ghost-drivers, cause deaths, injuries and considerable property damage. By wrong-way travel one should understand driving against the prescribed driving direction on a roadway, in this connection. A directional roadway, as defined here, is a roadway that is structurally separated from oncoming traffic. This kind of roadway may be found on freeways or expressways, such as enlarged German Federal highways. Wrong-way travel may be subdivided into forwards and backwards travel, the forwards travel being initiated by a wrong-way entrance or by turning around.

Detecting wrong-way travel via navigation units is not always reliably possible, since the data items of the navigation unit, such as the class and the direction of the road come too late in most cases of wrong-way travel, which means that the vehicles are then already located in the travel route envelope counter to the driving direction.

Modern motor vehicles use inertial sensors, such as acceleration sensors and yaw-rate sensors, as well as the steering angle, to determine the vehicle state, in order to implement safety and comfort systems. In addition, a multitude of motor vehicles these days have an internal GPS module, such as for a navigation system or a position finding of the motor vehicle.

Equipping motor vehicles with stereovideo cameras for detecting pedestrians is in the early stages, since they are in a position to measure precise distances and dimensions of objects.

SUMMARY OF THE INVENTION

The method according to the present invention for plausibility checking wrong-way travel of a motor vehicle on a directional roadway of a road basically includes the following steps:

recording at least one visual road feature; and
determining, with the aid of the visual road feature, whether the motor vehicle is located on a directional roadway.

For plausibility checking for a wrong-way travel, the method according to the present invention determines whether the motor vehicle is on a directional roadway at all, such as a freeway or an expressway. This realization is a basic step for the recognition or detection of a wrong-way travel. Drawing upon a visual road feature makes this possible in a simple and rapid manner. Thereby the optical recording of a visual road feature, by a stereovideo camera, for example, is able to increase the robustness and reliability in the realization or plausibility checking of wrong-way travel, which raises the safety of the motor vehicle and the passengers.

With the aid of a directionally dependent property of the visual road feature, it may be determined whether the motor vehicle is engaged in wrong-way travel. Thus, in a very efficient manner, the information content of a visual road feature may be used in addition, to establish a case of wrong-way travel. Some visual road features, such as an emergency stopping lane, which, in the United States, for example, is positioned to the right of the traffic lanes, or markings of exits are directionally coded, so to speak, which means they have a different orientation or form, as a function of the travel direction. Thus the information gain is maximized with little effort.

It is advantageously provided that, for the determination, at least one plausibility checking value is generated based on a standard regulation for the directional roadway. A standard regulation, such as the Highway Code, uniquely specifies certain features or criteria for various types of road, which are mandatory to be implemented and are thus easily detectable. A plausibility checking value for a road feature may then be a certain value of this feature, for instance, for an expressway. Such plausibility checking values increase the robustness of the method.

It is also possible for the visual road feature to include a lane width of a traffic lane or a width, length, or length of an interruption of a marking, particularly of a broken line, or, in the case of the width, of a dividing line, on the roadway of the road. These features are particularly well recorded optically from a traveling vehicle, since they lie in front of the vehicle in a well visible manner and manifest good contrast.

The visual road feature may include a road sign. As a further dimension of the recording, a sign or a sign structure may be included next to the roadway of the road. In this context, content and/or shape of the sign may be recorded and processed. This further dimension increases the safety and the reliability of the method. The road sign may be an advance direction sign of a freeway. The advance direction sign, also designated as sign "449" of the German highway code, is easy to detect because of its considerable size and specified color.

According to one specific embodiment of the present invention, it is provided that, for the determination, the detection of the front side of a road sign be used and for the determination and/or the establishment of wrong-way travel, the detection of the back side of a road sign is used. In one elegant way, the information content of the sign is used in a dual manner, first, to establish expressway travel and second, to establish wrong-way travel. Thus the information gain is maximized with little effort.

Especially advantageously it is provided that, for the recording, an image sensor, which may be a stereovideo camera of the motor vehicle, be used. Thus, the visual road features are recorded in the best manner. A stereoimage camera or a stereovideo camera is particularly suitable for recording and accurately measuring the rectangular markings and/or signs ahead of the vehicle.

According to the present invention, a control and recording device for plausibility checking a wrong-way travel of a motor vehicle on a directional roadway of a road is provided, having a recording arrangement for recording at least one visual road feature and a determining arrangement for determining, with the aid of the visual road feature, whether the motor vehicle is located on a directional roadway. Incidentally, the same advantages and modifications apply as were described above.

The recording arrangement may include at least one image sensor, which may be a stereovideo camera. The stereovideo camera of the motor vehicle is quite suitable for recording visual road features. The determining arrangement may include a controller or a control unit or a suitable arithmetic unit.

The control and recording device may include a control unit, which is configured to compare a signal of the image sensor to a plausibility checking value for a road feature. This control unit or control arithmetic unit may be developed as a separate unit or as a component, or even as a software routine of an already existing unit. Such a control unit enables the direct and rapid carrying out of the plausibility checking, which increases safety.

The control and recording device may have a memory for storing at least one plausibility checking value for a road feature. With that, the motor vehicle is able to check or compare measured values to the plausibility checking value, in autonomous fashion, that is, without connection to an external device. Alternatively, the plausibility checking value may be stored in an external device.

Advantageous further developments of the present invention are delineated in the dependent claims and described in the specification.

Exemplary embodiments of the present invention are explained in greater detail with reference to the drawings and the following description.

DETAILED DESCRIPTION

Figure 1:
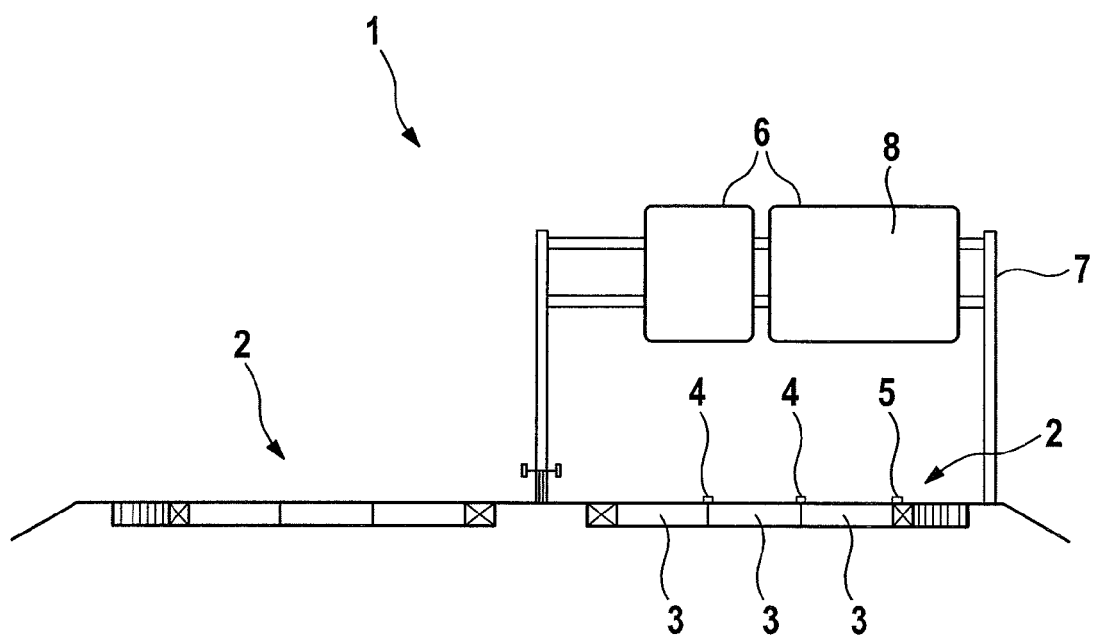
FIG. 1 shows a schematic representation of a directional roadway having standardizing features.

FIG. 1 shows schematically a sectional representation of a road 1, such as an expressway or a freeway. Road 1 is made up of two directional roadways 2 that are spatially separated from each other. Each directional roadway 2 has a plurality of traffic lanes or traffic tracks 3, in this instance, three traffic lanes per directional roadway 2. Two traffic lanes respectively are separated from each other by a broken line 4. An outer lying traffic lane 3 is bordered at its outer edge by a dividing line 5. Dividing line 5 is solid while broken lines 4 are interrupted.

On German freeways the width of a traffic lane 3 is at least 3.75 m, whereas on highways it is 3.5 m. The narrow line width on a German freeway amounts to at least 0.15 m, while it is 0.12 m on other roads. The wide line width on German freeways amounts to at least 0.3 m, while it is 0.25 m on other roads. The narrow line length on a German freeway amounts to 6 m, while it is 3 m on other German roads. The length of the interruption of a broken line on a German freeway is 12 m.

Furthermore, in FIG. 1 two road signs 6 are shown, in this case in the form of advance direction signs to freeways, according to German highway code signs "449". As shown, these signs 6 are usually situated on a sign bridge 7 or on sign carriers standing laterally next to the roadway. On their front side 8 signs 6 have information in white script on a blue background.

Figure 2:
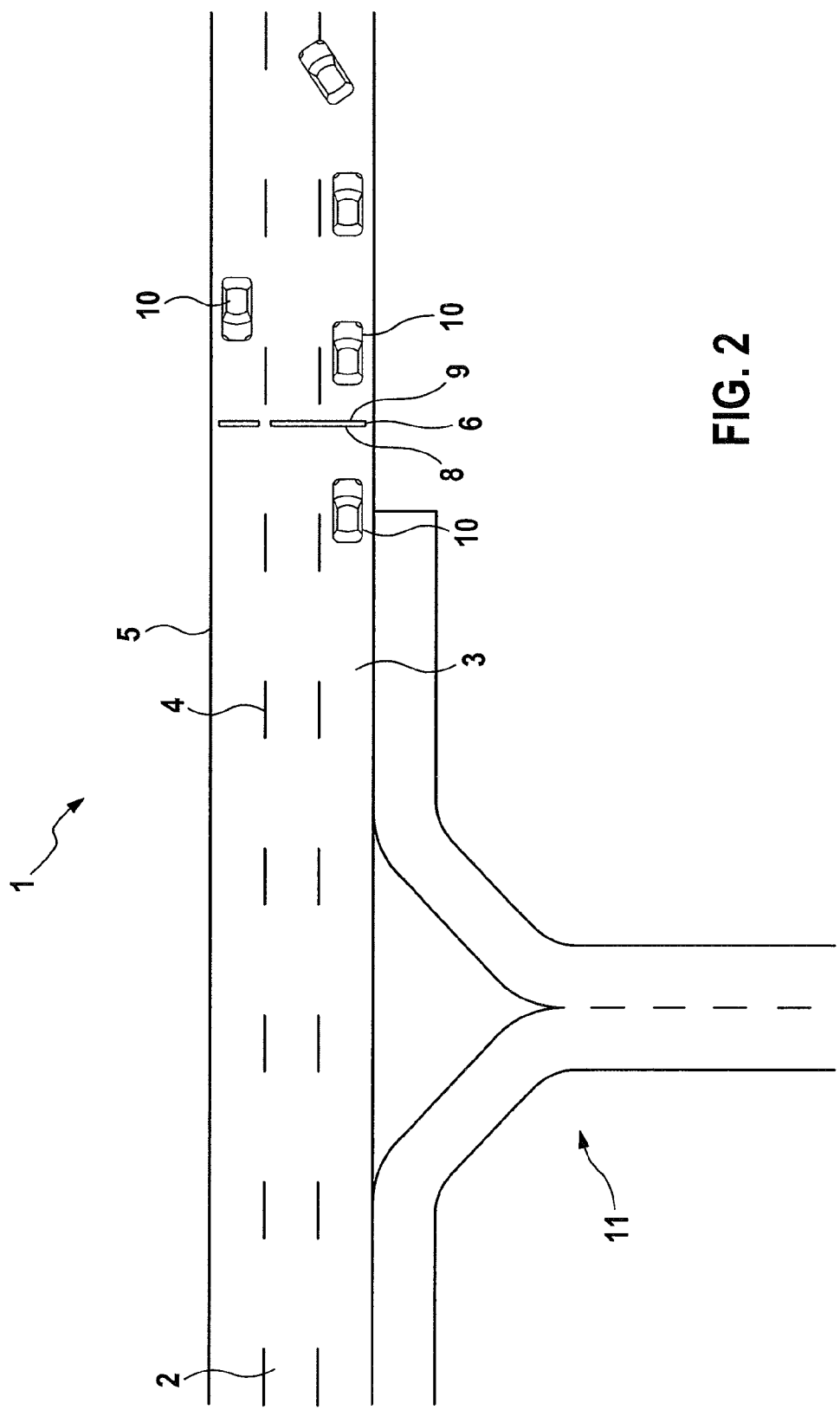
FIG. 2 shows a schematic representation of a directional roadway with motor vehicles.

FIG. 2 shows schematically the top view onto a directional roadway 2 of a road 1, in this case, a federal freeway. Directional roadway 2 includes a plurality of traffic lanes 3; next to broken lines 4 and dividing lines 5, road signs 6 are shown having a front side 8 and a back side 9.

On a right traffic lane 3, several vehicles 10 are moving on in a correct manner. One vehicle is engaged in wrong-way travel, that is, it is moving against the mandatory or admissible travel direction. Front sides 8 of road signs 6 face the correctly traveling vehicles 10, while back sides 9 of road sides 6 are facing away from the correctly traveling vehicles 10. In the case of the wrongly traveling vehicle 10, this is naturally the other way around. In addition, a connecting point 11 of road 1 is shown.

The track width of traffic lanes 3, the properties of broken lines 4 and of dividing lines 5, the properties of signs 6 as well as the properties of connecting point 11, all of them include visual road features. As will be described below, these visual road feature are used, according to the present invention, to establish whether a motor vehicle 10 is located on a directional roadway 2, or rather, whether there is wrong-way travel on the part of the motor vehicle.

Figure 3:
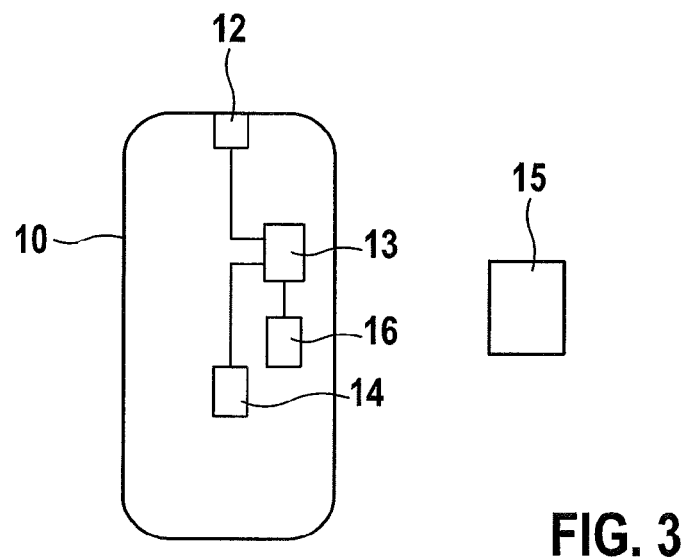
FIG. 3 shows a schematic representation of a motor vehicle having a control and recording device.

FIG. 3 schematically shows a motor vehicle 10, which corresponds to one of motor vehicles 10 in FIG. 1. Vehicle 10 includes a control and recording device for plausibility checking wrong-way travel of motor vehicle 10 on directional roadway 2 of road 1. By the term vehicle or motor vehicle one should understand, in this case, all driven means of transportation, such as passenger cars, trucks, buses, motorcycles, etc.

Motor vehicle 10 or the control and recording device includes at least one image sensor 12, for instance in the form of a stereoimage camera or in the form of a stereovideo camera. Image sensor 12 is situated on the front side of motor vehicle 10, so that it has a recording range lying in front of motor vehicle 10, in the travel direction. Motor vehicle 10, or rather the control and recording device, also includes a control unit or controller 13 as well as a communications interface 14, which is configured to communicate with an external device 15, such as central server. Control unit 13 is in communication or connection with sensor 12 and communications interface 14; this may be wire-bound or wireless.

Moreover, motor vehicle 10, or rather the control and recording device, includes a memory for storing at least one plausibility checking value for a road feature. Sensor 12, control unit 13, communications interface 14 and memory 16 may be developed, as shown here, as independent units, or they may be integrated in one or more units. It is not required, in particular, that each component be executed as hardware, but equally individual functions may be implemented as software routines or programs.

Using communications interface 14, data such as map data and/or functionalities, such as access to programs of external device 15 may be provided to motor vehicle 10 or the control and recording device.

Figure 4:
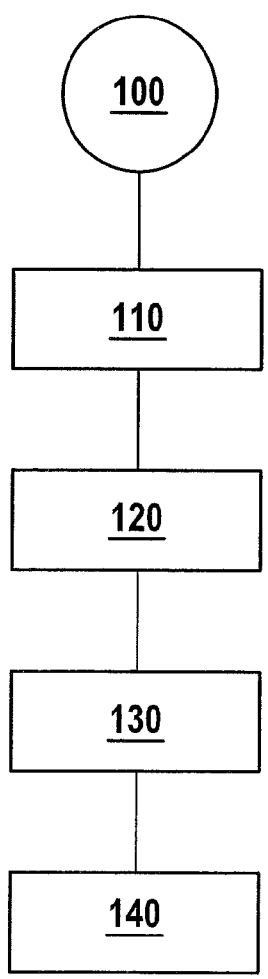
FIG. 4 shows a method for plausibility checking wrong-way travel of a motor vehicle, in the form of a flow chart.

Now, in an overall view with FIGS. 1 through 3, with the aid of FIG. 4 a method is described for plausibility checking of wrong-way travel of a motor vehicle 10.

In a first step 100, in a preliminary manner, at least one plausibility checking value is generated for visual road features based on a standard regulation for directional roadway 2. For example, the plausibility checking value for the width of a traffic lane is 3.75 m, which corresponds to the minimum width of a traffic lane of a German freeway.

In a second step 110, a visual road feature, such as a roadway marking 3, 4 or 5, or a road sign 6 is recorded by image sensor 12 of motor vehicle 10.

In a third step 120, it is determined whether motor vehicle 10 is located on a directional roadway 2. For this purpose, the recorded visual road feature is compared to the corresponding plausibility checking value. If the recorded visual road feature corresponds to the plausibility checking value, motor vehicle 10 is located on a directional roadway 2. If the recorded visual road feature and the plausibility checking value do not correspond, motor vehicle 10 is located on a different type of road. This type may alternatively be determined in the same manner. Only, for this purpose, other plausibility checking values are drawn upon. Thus, for instance, the lane width of a German freeway amounts to at least 3.75 m, while the lane width of a state highway is 3.50 m.

To determine the type of road, a one-time recording with comparison may be sufficient, or it may be provided to require a plurality of successful comparisons of a visual road feature to one or more plausibility checking values for the detection of the road type. Thus, two to ten, which may be three to five positive comparisons may be required.

Now, after it has been established that motor vehicle 10 is located on a directional roadway 2, it is determined in a fourth step 130 whether motor vehicle 10 is engaged in a false travel. For this purpose, direction-dependent properties or data of the visual road features are used. Thus it may be determined, for example, using image sensor 12, whether front side 8 of sign 6 is located in front of the vehicle, which applies to a vehicle 10 going in the correct travel direction. By contrast, a wrongly traveling vehicle 10 perceives back side 9 of sign 6. Accordingly, the positioning of connection point 11 may be regarded as a direction-dependent property. While correctly traveling vehicles 10 have to have connecting point 11 on their right side, in the direction of travel, for vehicle 10 engaged in wrong-way travel, connection point 11 makes its appearance on the left side. One is able to determine whether a motor vehicle is engaged in wrong-way travel with the aid of these and further visual road features.

Subsequently, in a further step 140, reactions to the detection of the wrong-way travel may take place. This may include passive actions, such as warnings or warning information to the driver of motor vehicle 10, and also active actions, such as an intervention in the motion and/or steering of motor vehicle 10.

What is claimed is:

1. A method for checking for wrong-way travel of a motor vehicle on a directional roadway of a road having at least two directional roadways that are structurally separated from each other, the method comprising:
   recording, using an image sensor of the motor vehicle, at least one visual road feature of the road having the at least two directional roadways that are structurally separated from each other, the at least one visual road feature including at least one of: a width of a component of the road, or a length of a component of the road;
   comparing, using a control unit of the motor vehicle, the recorded width or length of the component of the road to a checking value, wherein the checking value is based on a standard regulation for the directional roadway, the checking value including at least one of: a regulated width of the component of the road, or a regulated length of the component of the road;
   determining, using the control unit, that the motor vehicle is located on the directional roadway of the road having the at least two directional roadways that are structurally separated from each other based on the comparing;
   upon determining that the motor vehicle is located on the directional roadway, determining, using the control unit, that the motor vehicle is engaged in wrong-way travel based on a directionally dependent property of the at least one visual road feature of the road having the at least two directional roadways that are structurally separated from each other; and
   upon determining that the motor vehicle is engaged in wrong-way travel, at least one of: providing a warning to a driver the motor vehicle, or performing an intervention in the operation of the motor vehicle.

2. The method of claim 1, wherein the at least one visual road feature includes a lane width of a traffic lane.

3. The method of claim 1, wherein the at least one visual road feature includes a road sign.

4. A method for checking for wrong-way travel of a motor vehicle on a directional roadway of a road, the method comprising: recording at least one visual road feature, the at least one visual road feature including at least one road sign; determining, with the aid of the at least one visual road feature, whether the motor vehicle is located on a directional roadway; and establishing the wrong-way travel based on a detection of a back side of the at least one road sign.

5. A device for checking for wrong-way travel of a motor vehicle on a directional roadway of a road having at least two directional roadways that are structurally separated from each other, the device comprising:
   a recording arrangement to record at least one visual road feature of the road having the at least two directional roadways that are structurally separated from each other, the at least one visual road feature including at least one of: a width of a component of the road, or a length of a component of the road; and
   a controller to:
      compare the recorded width or length of the component of the road to a checking value, wherein the checking value is based on a standard regulation for the directional roadway, the checking value being at least one of: a regulated width of the component, or a regulated length of the component;
      determine that the motor vehicle is located on the directional roadway of the road having the at least two directional roadways that are structurally separated from each other based on the comparing; and
      upon determining that the motor vehicle is located on the directional roadway, determine that the motor vehicle is engaged in wrong-way travel based on a directionally dependent property of the at least one visual road feature of the road having the at least two directional roadways that are structurally separated from each other; and
      upon determining that the motor vehicle is engaged in wrong-way travel, at least one of: providing a warning to a driver the motor vehicle, or performing an intervention in the operation of the motor vehicle.

6. The device of claim 5, further comprising: an interface to receive the checking value.

7. The device of claim 5, further comprising: a memory for storing the checking value.

8. The method of claim 1, wherein the image sensor includes at least one of: a stereovideo camera of the motor vehicle, or a stereoimage camera of the motor vehicle.

9. The device of claim 5, wherein the at least one visual road feature includes at least one of: a lane width of a traffic lane, or a width of a lane marking.

10. The device of claim 5, wherein the at least one visual road feature includes a road sign.

11. The device of claim 5, wherein the controller performs the determining whether the motor vehicle is engaged in the wrong-way travel upon determining that the motor vehicle is located on the directional roadway.

12. The method of claim 1, wherein the determining whether the motor vehicle is engaged in the wrong-way travel is performed upon determining that the motor vehicle is located on the directional roadway.

13. The method of claim 1, wherein the at least one visual road feature includes a color of a road sign.

14. The method of claim 1, wherein the at least one visual road feature includes printed information on a road sign.

15. The method of claim 1, wherein the at least one visual road feature includes a width of a traffic lane marking.

16. A device for checking for wrong-way travel of a motor vehicle on a directional roadway of a road having the at least two directional roadways that are structurally separated from each other, the device comprising:
    an image sensor to record at least one visual road feature of the road having the at least two directional roadways that are structurally separated from each other, the at least one visual road feature including at least one of: a width of a component of the road, or a length of a component of the road; and
    a controller to:
        compare the recorded width or length of the component of the road to a checking value, wherein the checking value is based on a standard regulation for the directional roadway, the checking value including at least one of: a regulated width of the component of the road, or a regulated length of the component of the road;
        determine that the motor vehicle is located on the directional roadway of the road having the at least two directional roadways that are structurally separated from each other based on the comparing;
        upon determining that the motor vehicle is located on the directional roadway, determine that the motor vehicle is engaged in wrong-way travel based on a directionally dependent property of the at least one visual road feature of the road having the at least two directional roadways that are structurally separated from each other; and
        upon determining that the motor vehicle is engaged in wrong-way travel, at least one of: providing a warning to a driver the motor vehicle, or performing an intervention in the operation of the motor vehicle.

17. The device of claim 16, wherein the at least one visual road feature includes a width of a traffic lane.

18. A device for checking for wrong-way travel of a motor vehicle on a directional roadway of a road, the device comprising: an image sensor to record at least one visual road feature, the at least one visual road feature including at least one road sign; and a controller to: determine, with the aid of the at least on visual road feature, whether the motor vehicle is located on a directional roadway; and establish the wrong-way travel based on a detection of a back side of the at least one road sign.

19. The device of claim 18, wherein the controller determines whether the motor vehicle is located on the directional roadway based on a detection of a front side of the at least one road sign.

20. The method of claim 4, wherein the determining whether the motor vehicle is located on the directional roadway is based on a detection of a front side of the at least one road sign.

21. The method of claim 1, wherein at least one dimension of the visual road feature includes at least one of: a width of a traffic lane, a width of a line on the road, a length of a broken line on the road, or a length of an interruption of the broken line on the road.

* * * * *